(12) United States Patent
Raghavan et al.

(10) Patent No.: US 12,375,142 B2
(45) Date of Patent: Jul. 29, 2025

(54) METHOD FOR SHARING DYNAMIC CAPABILITY OF LEVEL OF CALIBRATION TO OTHER DEVICES IN NETWORK

(71) Applicant: QUALCOMM Incorporated, San Diego, CA (US)

(72) Inventors: Vasanthan Raghavan, West Windsor Township, NJ (US); Kobi Ravid, Closter, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/066,988

(22) Filed: Dec. 15, 2022

(65) Prior Publication Data
US 2024/0204836 A1 Jun. 20, 2024

(51) Int. Cl.
| | | |
|---|---|---|
| *H04B 7/06* | (2006.01) | |
| *H04B 17/11* | (2015.01) | |
| *H04B 17/21* | (2015.01) | |
| *H04W 92/18* | (2009.01) | |

(52) U.S. Cl.
CPC ......... *H04B 7/0617* (2013.01); *H04B 7/0634* (2013.01); *H04B 17/11* (2015.01); *H04B 17/21* (2015.01); *H04W 92/18* (2013.01)

(58) Field of Classification Search
None
See application file for complete search history.

(56) References Cited

U.S. PATENT DOCUMENTS

| | | | | |
|---|---|---|---|---|
| 2019/0349098 | A1* | 11/2019 | Jiang | H04B 17/11 |
| 2020/0029345 | A1* | 1/2020 | Malik | H04W 24/10 |
| 2024/0064727 | A1* | 2/2024 | Zhao | H04B 17/12 |
| 2024/0089016 | A1* | 3/2024 | Marcone | H04B 17/21 |

FOREIGN PATENT DOCUMENTS

WO 2022152442 A1 7/2022

OTHER PUBLICATIONS

International Search Report and Written Opinion—PCT/US2023/080962—ISA/EPO—Mar. 27, 2024.

\* cited by examiner

*Primary Examiner* — Walter J Divito
(74) *Attorney, Agent, or Firm* — QUALCOMM Incorporated

(57) ABSTRACT

Method and apparatus for sharing dynamic capability levels of calibration to other devices in a network. The apparatus transmits, to a second UE, a first calibration capability message indicating a first set of one or more levels of calibration capabilities. The apparatus performs an online calibration procedure with the second UE based at least on the first calibration capability message indicating the first set of one or more levels of the calibration capabilities. The apparatus may receive, from the second UE, a second calibration capability message associated with the second UE indicating a second set of one or more levels of the calibration capabilities for the second UE. The apparatus may transmit a beamforming loss indication indicating a loss in beamforming array gain with use of an uncalibrated amplitude or phase settings corresponding to at least one of an operating frequency, a temperature level, or a gain stage level.

30 Claims, 13 Drawing Sheets

METHOD FOR SHARING DYNAMIC CAPABILITY OF LEVEL OF CALIBRATION TO OTHER DEVICES IN NETWORK

TECHNICAL FIELD

The present disclosure relates generally to communication systems, and more particularly, to a configuration for sharing dynamic capability levels of calibration to other devices in a network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first UE. The device may be a processor and/or a modem at a first UE or the first UE itself. The apparatus transmits, to a second UE, a first calibration capability message indicating a first set of one or more levels of calibration capabilities. The apparatus performs an online calibration procedure with the second UE based at least on the first calibration capability message indicating the first set of one or more levels of the calibration capabilities.

In an aspect of the disclosure, a method, a computer-readable medium, and an apparatus are provided. The apparatus may be a device at a second UE. The device may be a processor and/or a modem at a second UE or the second UE itself. The apparatus receives, from a first UE, a first calibration capability message indicating a first set of one or more levels of calibration capabilities of the first UE. The apparatus performs an online calibration procedure with the first UE based at least on the first calibration capability message indicating the first set of one or more levels of the calibration capabilities.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
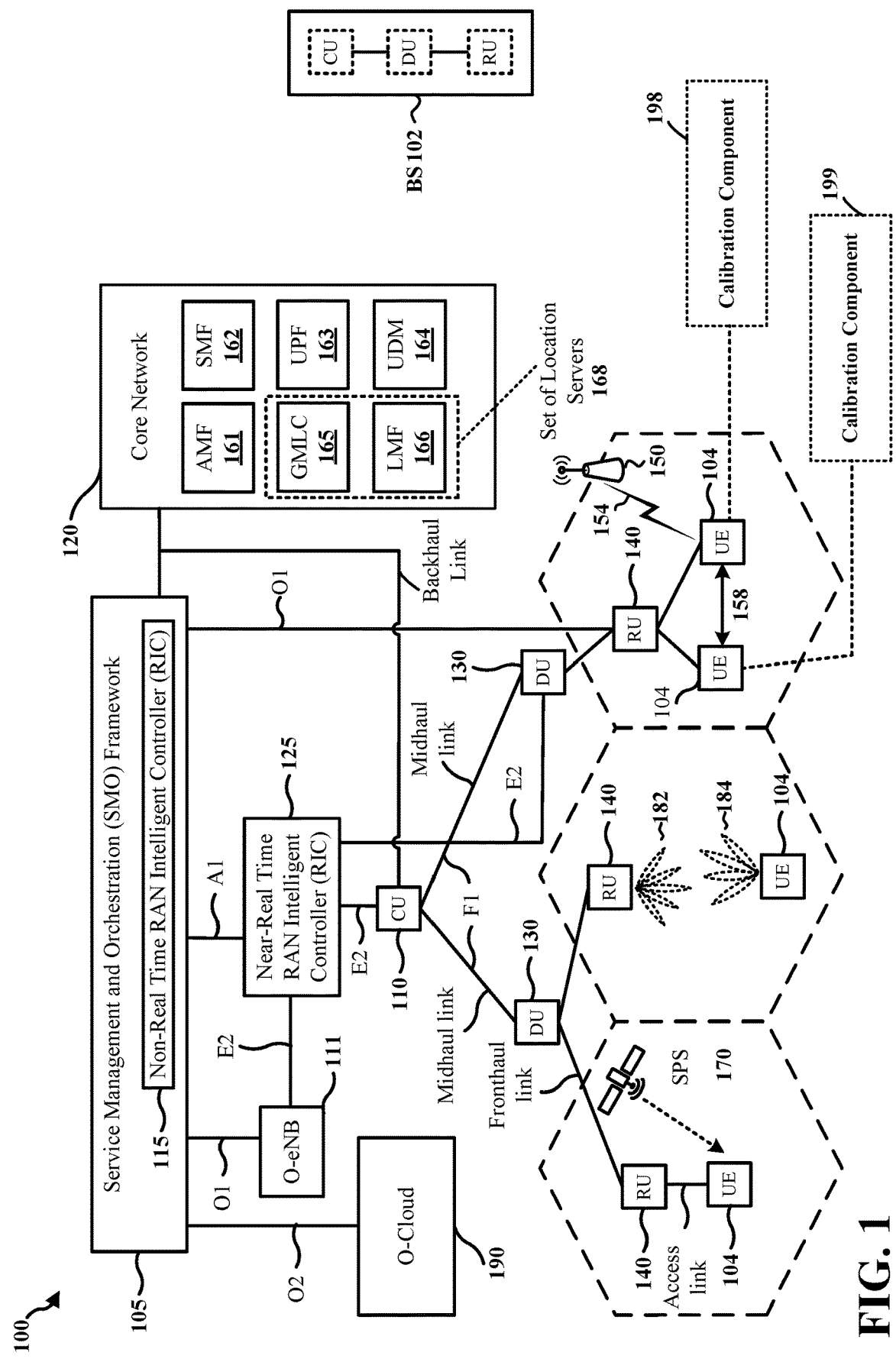
FIG. 1 is a diagram illustrating an example of a wireless communications system and an access network.

In wireless communications, such as but not limited to millimeter wave (mmW) communications, beamforming may be utilized to coherently combine energy and overcome high path losses experienced at higher frequencies. As such, a set of beamforming weights to be used over the phase shifters associated with individual antenna elements may be computed for signaling. Beamforming weights may be determined at the UE antennas that are in receive mode.

However, the determined beamforming weights may not be reused for transmission from the UE antennas due to RF pathways or circuitry being different since the RF circuitry used for reception is different from that used for transmission. In contrast to the UE-base station link where the base station, being a central network resource, may be expected to be calibrated, when two devices at the end of the link are UEs (e.g., sidelink communication, in a vehicular network, or in an Industrial Internet of Things context), it may not be expected that both UEs are calibrated due in part to a lack of a central network resource (e.g., golden device). Different devices in the network may have different levels or capabilities of calibration.

Aspects presented herein provide a configuration for sharing dynamic capability levels of calibration to other devices in a network. The configuration may allow UEs to perform online calibration procedures with each other based on calibration capabilities provided to the UEs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2-1 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2-1. FR4, FR3, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a calibration component 198 configured to transmit, to a second UE, a first calibration capability message indicating a first set of one or more levels of calibration capabilities; and perform an online calibration procedure with the second UE based at least on the first calibration capability message indicating the first set of one or more levels of the calibration capabilities.

Referring again to FIG. 1, in certain aspects, the UE 104 may include a calibration component 199 configured to receive, from a first UE, a first calibration capability message indicating a first set of one or more levels of calibration capabilities of the first UE; and perform an online calibration procedure with the first UE based at least on the first calibration capability message indicating the first set of one or more levels of the calibration capabilities.

Although the following description may be focused on 5G NR, the concepts described herein may be applicable to other similar areas, such as LTE, LTE-A, CDMA, GSM, and other wireless technologies.

Figure 2:
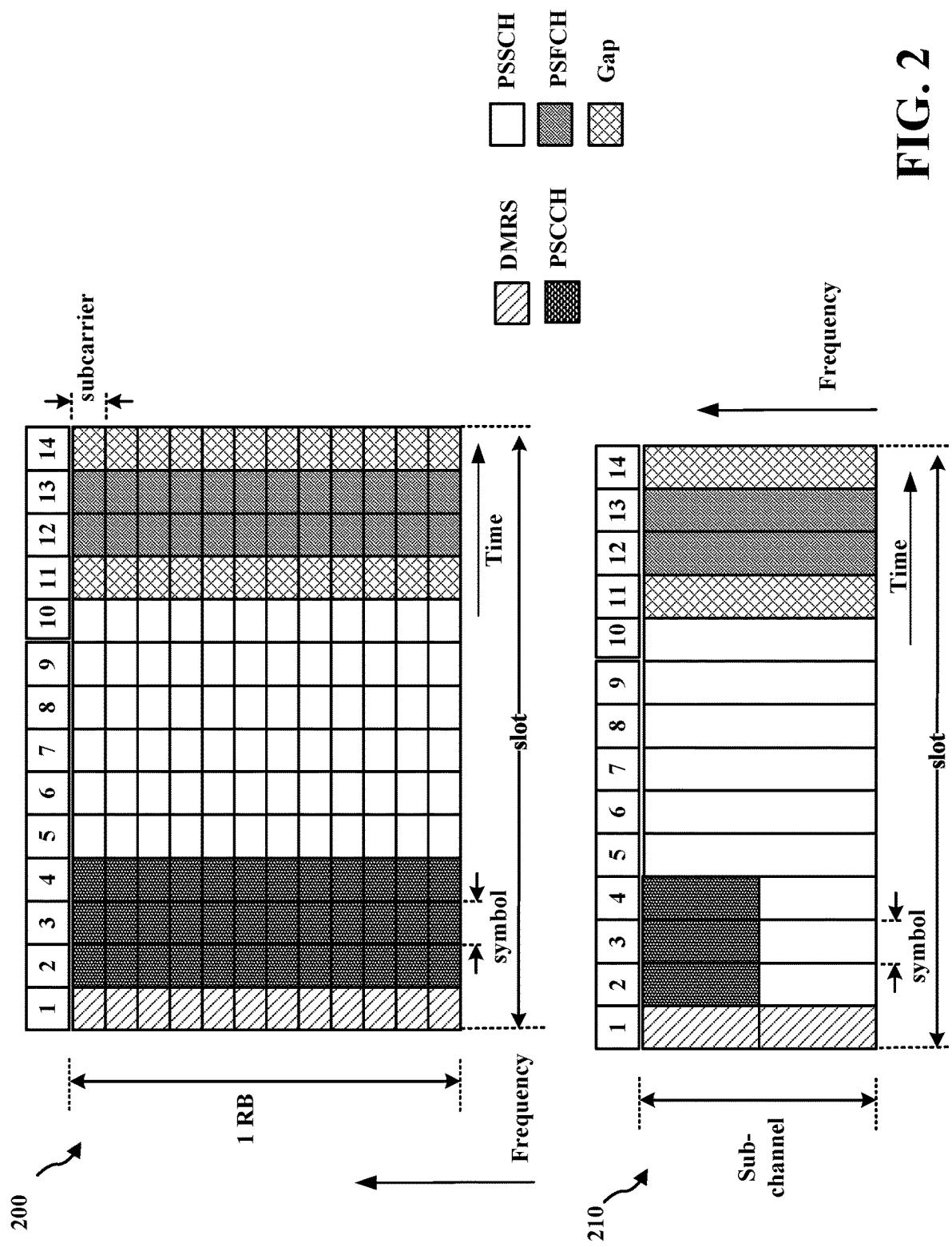
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
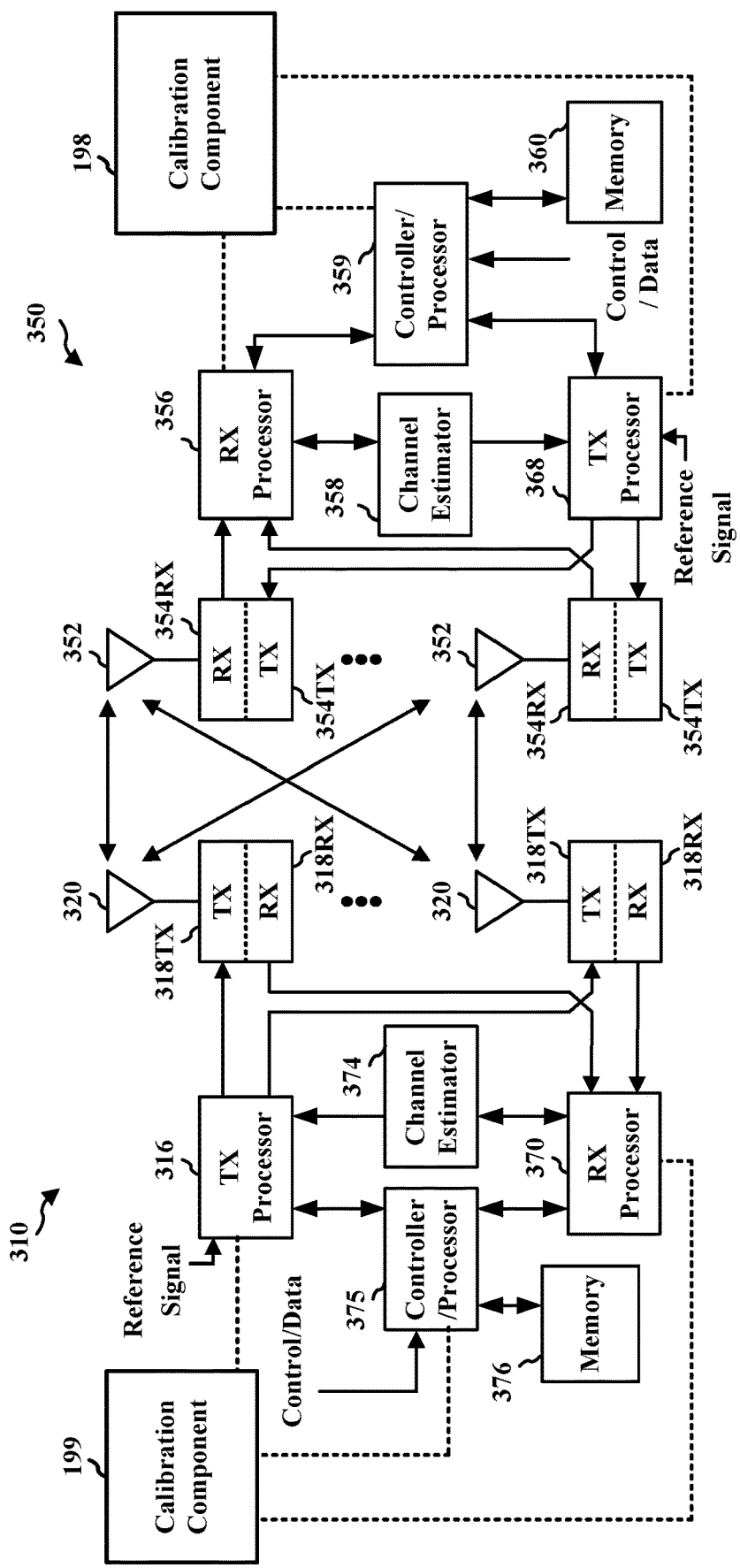
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate a radio frequency (RF) carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
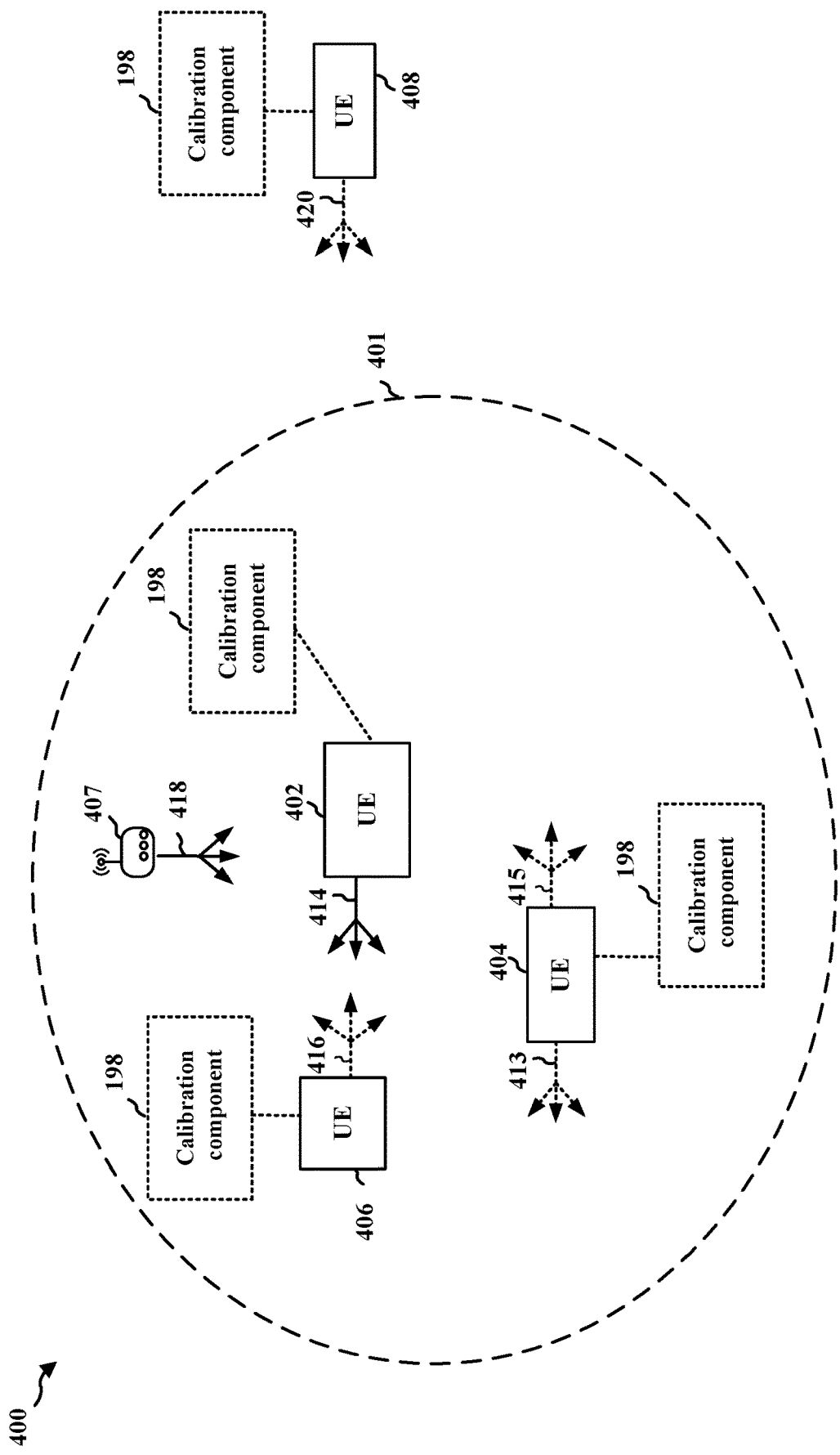
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit sidelink transmissions 413, 415 intended for receipt by other UEs within a range 401 of UE 404, and UE 406 may transmit sidelink transmission 416. Additionally, or alternatively, the RSU 407 may receive communication from and/or transmit communication 418 to UEs 402, 404, 406, 408. One or more of the UEs 402, 404, 406, 408 or the RSU 407 may comprise a BSR component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

In wireless communications, such as but not limited to mmW communications, beamforming may be utilized to coherently combine energy and overcome high path losses experienced at higher frequencies. As such, a determination of beamforming weights may be computed for signaling. Beamforming weights may be determined at the UE antennas that are in receive mode. However, the determined beamforming weights may not be reused for transmission from the UE antennas due to RF pathways or circuitry being different. For example, RF pathways for transmission and reception each include different hardware components, such as for example, a different set of amplifiers, mixers, couplers, filters, digital-to-analog converters, analog-to-digital converters, or the like.

Newer class of devices may be utilized in frequency range 2 systems (FR2) and beyond, as wireless systems evolve (e.g., nodes, repeaters, intelligent reflective systems (IRS), or the like). Such devices may also tend to dominate beyond FR2 bands, such as FR2X, frequency range 3 (FR3), frequency range 4 (FR4), frequency range 5 (FR5), or the like.

In contrast to the UE-base station link where the base station, being a central network resource, may be expected to be calibrated, when two devices at the end of the link are UEs (e.g., sidelink communication), it may not be expected that both UEs are calibrated due in part to a lack of a central network resource (e.g., golden device). Different devices in the network may have different levels or capabilities of calibration. For example, some devices may have all antennas calibrated for certain sets of amplitude levels at a certain carrier and/or band. However, only some antennas or some amplitude levels may be fully calibrated in certain carriers and/or bands.

Aspects presented herein provide a configuration for sharing dynamic capability levels of calibration to other devices in a network. The configuration may allow UEs to perform online calibration procedures with each other based on calibration capabilities provided to the UEs. At least one advantage of the disclosure may allow for providing feedback of differing calibration capabilities to other devices in a network to assist with online calibration tasks.

Figure 5:
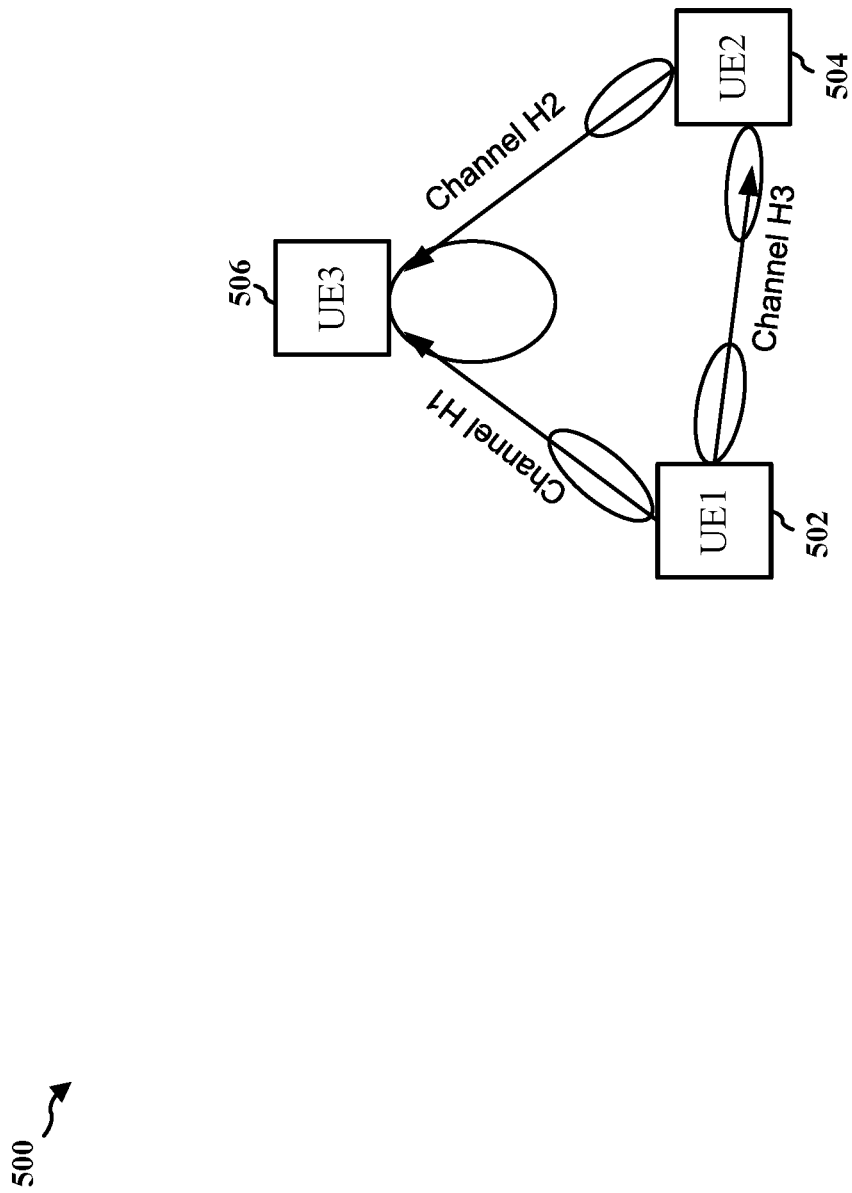
FIG. 5 illustrates an example of sidelink communication between multiple UEs, in accordance with aspects presented herein.

FIG. 5 is a diagram 500 of sidelink communication between multiple UEs. The diagram 500 of FIG. 5 includes a first UE 502, a second UE 504, and a third UE 506. The UEs may intend to communicate with each other with beamformed transmissions. All the UE may have multiple antenna elements that may or may not be calibrated. Different reasons may be the cause of a lack of calibration. For example, calibration is typically performed across antenna elements at certain frequencies of interest, certain amplitude or power levels, or at certain temperature levels. In some instances, when the operating conditions change, dramatically, rapidly, or at an unexpected rate, from the conditions over which calibration was performed, the residual errors may be significant. Such residual errors may dominate the user experience and result in a degradation of performance.

Figure 6:
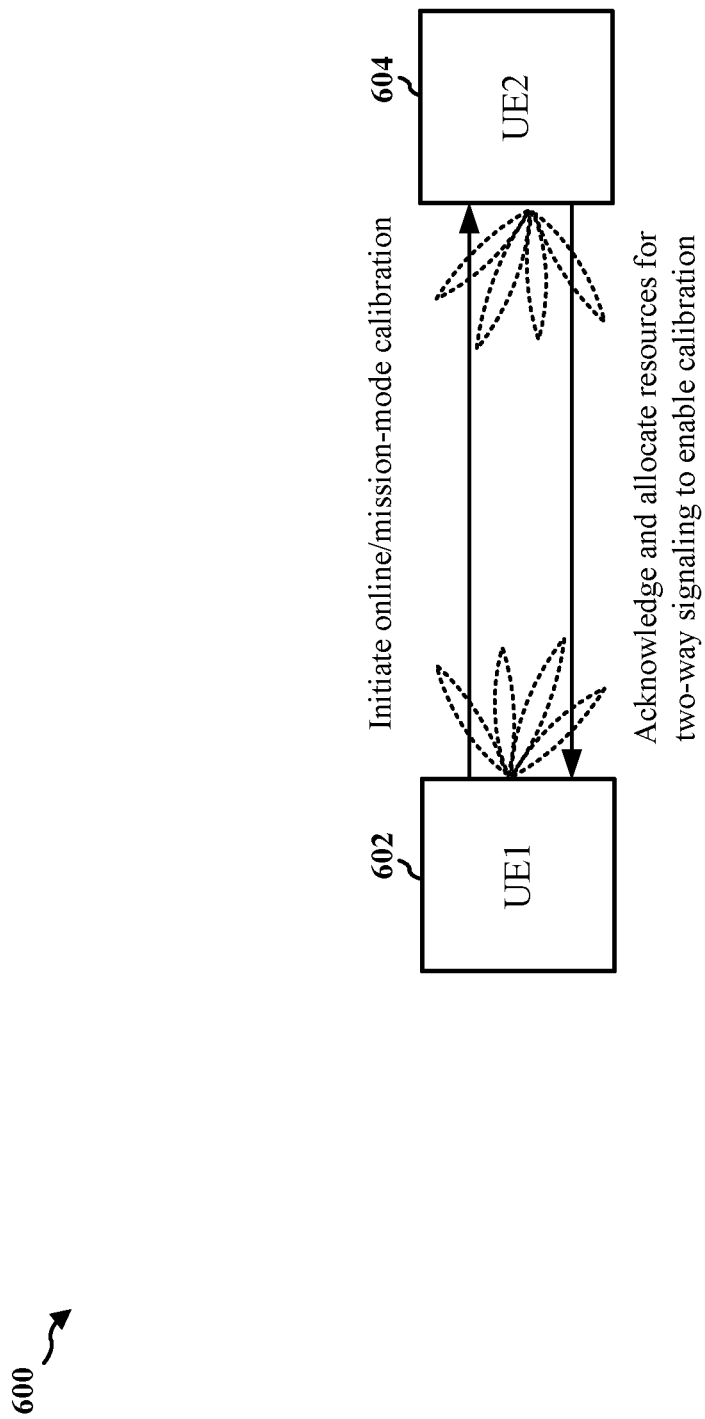
FIG. 6 illustrates an example of an online calibration procedure between a first UE and a second UE, in accordance with aspects presented herein.

FIG. 6 is a diagram 600 of an online calibration procedure between a first UE 602 and a second UE 604. In some instances, if the first UE 602 and the second UE 604 are in communications and both are not fully calibrated at the operating point, then the first UE 602 and the second UE 604 may assist each other in online calibration via two-way communications. Different devices in a network may have different levels of calibration capabilities. Calibration parameters may comprise a number of antenna elements due to a phase shifter being used individually per antenna element, a number of frequency sampling points, a number of amplitude and/or power sampling points, a number of temperature sampling points, or the like. These calibration parameters are a non-exhaustive example of calibration parameters, and the disclosure is not intended to be limited to the examples disclosed herein, such that other calibration parameters may be utilized.

In some aspects, a typical number of antenna elements may comprise the range of 4-8 for UEs at FR2-1 (e.g., 24.25-52.6 GHz), 8-16 at FR2-2 (e.g., 52.6-71 GHz), 16-32 (e.g., 71-114.25 GHZ), or 32-64 (e.g., 114.25-300 GHz). In some instances, a UE may be configured to operate from −4 F to 113 F with greater than 60 samples assuming one sample every 2 F. In some instances, a UE may be configured to operate over an entire frequency range depending on RF circuit components' bandwidth with frequency sampling on the order of one over a few subcarriers leading to over 250 sampling points for support of 3 GHZ with samples over every 100 subcarriers. In some instances, a UE may have 32-64 amplitude control points. A UE may need a number of sample points based on the calibration parameters. For example, a UE may need at least 64 antenna samples*60 temperature samples*250 frequency samples*64 amplitude samples which results in more than $60 \times 10^6$ sample points for calibration. However, in other instances, the UE may need more or less than $60 \times 10^6$ sample points, and the disclosure is not intended to be limited to the aspects presented herein. Given the large number of sample points, calibration may not be performed for all sample points and calibration may be determined via extrapolation. Inaccuracies due to poor calibration extrapolation may accumulate and may lead to beamforming mismatches and/or losses. For example, a 2-3 dB loss may occur with 4×1 arrays even with a 20°-30° mismatch in calibration accuracy of phases.

In some aspects, if the first UE 602 and the second UE 604 have N and M antenna elements, respectively, then 2NM measurements may be needed to calibrate both the first UE and the second UE. In some aspects, calibration may be based on a two-step approach. For example, the first UE may beamform or transmit a training beam while the second UE scans through M receive training beams. The second UE may then beamform or transmit along the same set of M training beams while the first UE receives with the training beam at its end. The first UE may feedback a complex signal to the second UE allowing the second UE to make an estimate of the transmission-reception phase mismatch at the second UE's end. This process may be repeated N times for N training beams at the first UE so that the mismatches at all the antennas at the second UE may be estimated. This process may be repeated, as needed, based on the number of antennas that need calibration at both the first UE and the second UE.

In some aspects, if one of the two UEs in communications is not calibrated at the operating point, the calibrated device may serve as anchor which may allow the uncalibrated node/device to be calibrated via two-way communications. For example, if the first UE and the second UE have N and M antenna elements, respectively, and the first UE is calibrated, then 2M measurements would be needed to calibrate the second UE. In such instances, the first UE may beamform or transmit with a training beam and the second UE scans through M receive training beams. The second UE may then beamform or transmit along the same set of M training beams while the first UE receives with the training beam at the first UE. The first UE may feedback a complex signal to the second UE which may allow the second UE to make an estimate of the transmission-reception phase mismatch at the second UE's end. As such, the number of measurements for the online calibration may be based on whether a device is calibrated.

In some aspects, a device may share its level of calibration as a capability over the network. The calibration capability may comprise one of a full, a partial, or no antenna calibration at the operating frequency and/or temperature level. The calibration capability may be shared for different operating frequencies and/or temperature levels. In such instances, the UE may have different calibration capabilities for different operating frequencies and/or temperature levels. In some aspects, a partial calibration may be indicated by how many antenna elements are calibrated or not calibrated. Alternately, a loss in beamforming without performing a calibration may be indicated and other devices in the network may determine whether online calibration is necessary based on the provided indication. The calibration capability may be dynamic as the UE obtains more information related to calibration parameters based on the online calibration operation. In some aspects, a corresponding set of two-way communications to enable online calibration may be performed based on the calibration capabilities shared by the devices.

Figure 7:
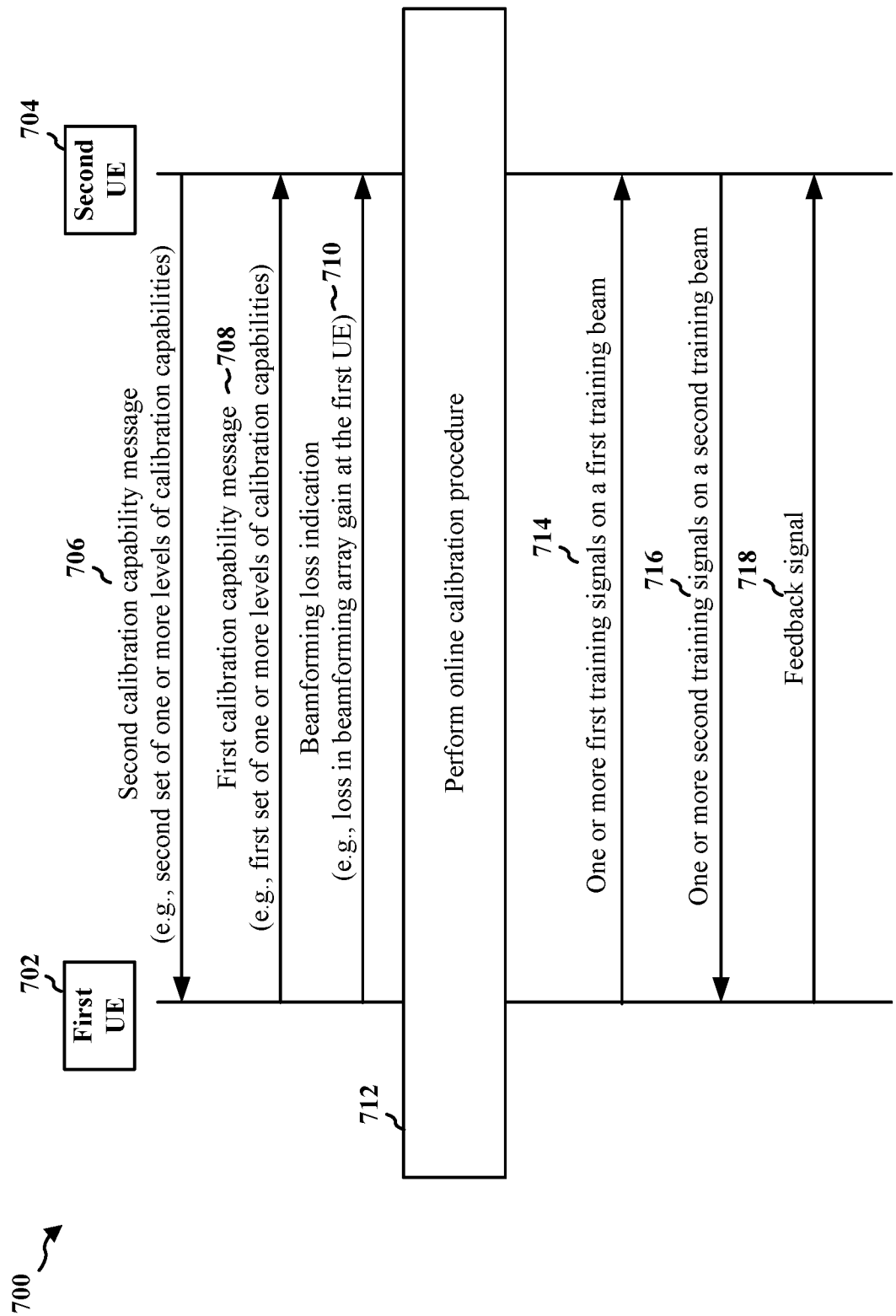
FIG. 7 is a call flow diagram of signaling between a first UE and a second UE.

FIG. 7 is a call flow diagram 700 of signaling between a first UE 702 and a second UE 704. The UE 702 may be configured to communicate with the base station (not shown). For example, in the context of FIG. 1, the UE 702 may correspond to at least UE 104, the UE 704 may correspond to at least UE 104. In another example, in the context of FIG. 3, the UE 704 may correspond to device 310 and the UE 702 may correspond to device 350.

At 706, the second UE 704 may transmit a second calibration capability message to the first UE 702. The first UE 702 may receive the second calibration capability message from the second UE 704. The second calibration capability message may be associated with the second UE. The second calibration capability message may indicate a second set of one or more levels of calibration capabilities for the second UE. The second UE may transmit and the first UE may receive the second calibration capability message based on any of the aspects described in connection with FIG. 6.

At 708, the first UE may transmit a first calibration capability message to the second UE 704. The second UE 704 may receive the first calibration capability message from the first UE 702. The first calibration capability message may indicate a first set of one or more levels of calibration capabilities. In some aspects, the first set of one or more levels of the calibration capabilities may comprise at least one of full antenna calibration, partial antenna calibration, or no antenna calibration. The first calibration capability message may also comprise an amount of antenna elements at the first UE. The first set of one or more levels of the calibration capabilities may be associated with at least one operating frequency, at least one temperature level, or at least one gain stage level. In some aspects, the first set of one or more levels of the calibration capabilities may be associated with a plurality of operating frequencies. Each of the plurality of operating frequencies may comprise a corresponding level of the calibration capabilities. In some aspects, the first set of one or more levels of the calibration capabilities may be associated with a plurality of temperature levels. Each of the plurality of temperature levels may comprise a corresponding level of the calibration capabilities. In some aspects, the first set of one or more levels of the calibration capabilities may be associated with a plurality of gain stage levels. Each of the plurality of gain stage levels may comprise a corresponding level of the calibration capabilities. In some aspects, the partial antenna calibration may be based on the amount of the antenna elements that are fully calibrated or not calibrated. The first UE may transmit and the second UE may receive the first calibration capability message based on any of the aspects described in connection with FIG. 6.

At 710, the first UE 702 may transmit the beamforming loss indication to the second UE 704. The second UE 704 may receive the beamforming loss indication from the first UE 702. The beamforming loss indication may indicate a loss in beamforming array gain at the first UE with use of an uncalibrated amplitude or phase settings corresponding to at least one of an operating frequency, a temperature level, or a gain stage level. The beamforming loss indication may trigger the online calibration procedure with the second UE. The first UE may transmit the beamforming loss indication based on any of the aspects described in connection with FIG. 6.

At 712, the first UE 702 and the second UE 704 may perform an online calibration procedure with each other. The first UE 702 may perform the online calibration procedure with the second UE 704 based at least on the first calibration capability message indicating the first set of one or more levels of the calibration capabilities. In some aspects, the performing the online calibration procedure may be based at least on the first calibration capability messages associated with the first UE and the second calibration capability messages associated with the second UE. The online calibration procedure may be performed based on any of the aspects described in connection with FIG. 6.

At 714, the first UE 702 may transmit the one or more first training signals to the second UE. The second UE 704 may receive the one or more first training signals from the first UE. The first UE may transmit the one or more first training signals on a first training beam. The second UE may receive the one or more first training signals on the first training beam. Transmission of the one or more first training signals to the second UE may be based on any of the aspects described in connection with FIG. 6.

At 716, the second UE 704 may transmit one or more second training signals to the first UE 702. The first UE 702 may receive the one or more second training signals from the second UE 704. The second UE may transmit the one or more second training signals on a second training beam. The first UE may receive the one or more second training signals from the second UE on the second training beam. Transmission of the one or more second training signals to the first UE may be based on any of the aspects described in connection with FIG. 6.

At 718, the first UE 702 may transmit the feedback signal to the second UE 704. The second UE 704 may receive the feedback signal from the first UE 702. In some aspects, a transmit-receive mismatch may be calculated at the second UE based on the feedback signal. In some aspects, the first UE may be fully calibrated and a number of measurements to fully calibrate the second UE may be based on an amount of antenna elements at the second UE. In some aspects, the first UE and the second UE may not be fully calibrated, wherein the online calibration procedure is repeated based on an amount of antenna elements at both the first UE and the second UE. Transmission of the feedback signal to the second UE may be based on any of the aspects described in connection with FIG. 6.

Figure 8:
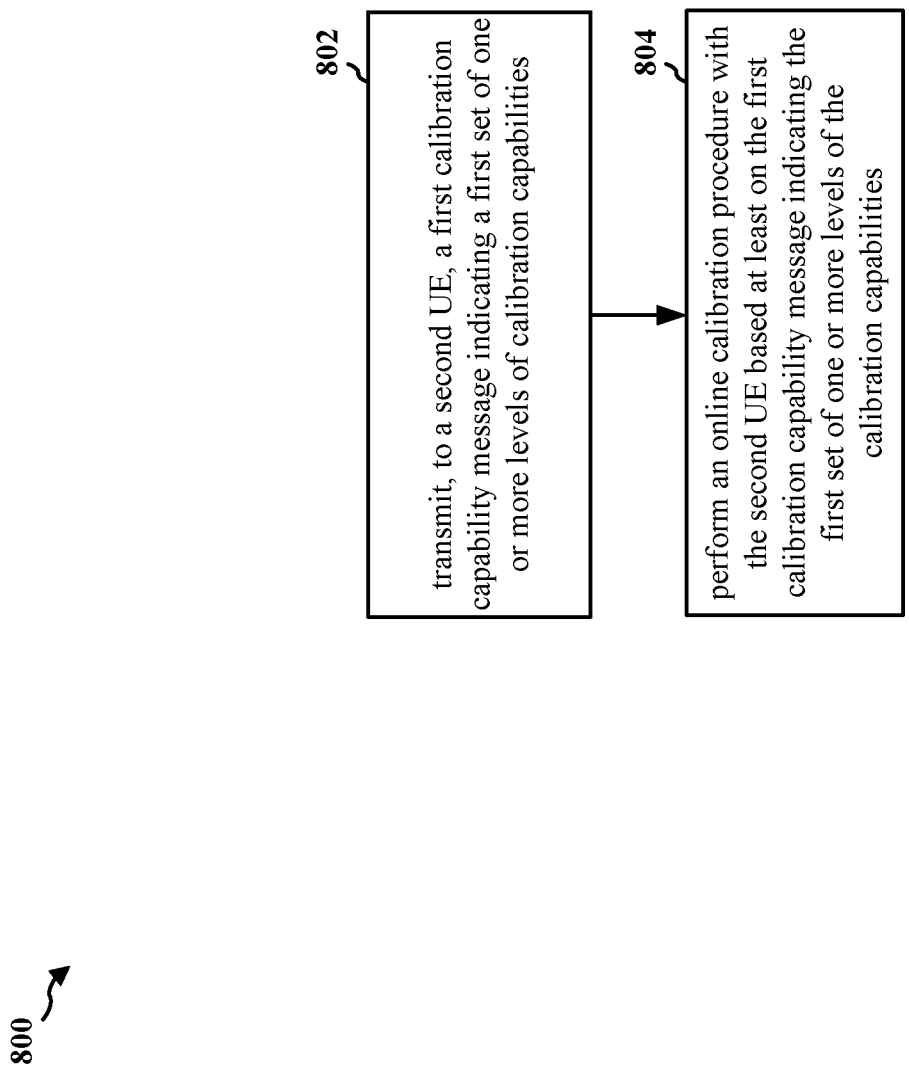
FIG. 8 is a flowchart of a method of wireless communication.

FIG. 8 is a flowchart 800 of a method of wireless communication. The method may be performed by a UE (e.g., the UE 104; the apparatus 1004). One or more of the illustrated operations may be omitted, transposed, or contemporaneous. The method may allow a first UE to perform an online calibration procedure with a second UE based on calibration capabilities shared between the first and second UEs.

At 802, the first UE may transmit a first calibration capability message. For example, 802 may be performed by calibration component 198 of apparatus 1004. The first UE may transmit the first calibration capability message to a second UE, based on any of the aspects described in connection with FIG. 6. The first calibration capability message may indicate a first set of one or more levels of calibration capabilities. In some aspects, the first set of one or more levels of the calibration capabilities may comprise at least one of full antenna calibration, partial antenna calibration, or no antenna calibration. The first calibration capability message may also comprise an amount of antenna elements at the first UE. The first set of one or more levels of the calibration capabilities may be associated with at least one operating frequency, at least one temperature level, or at least one gain stage level. In some aspects, the first set of one or more levels of the calibration capabilities may be associated with a plurality of operating frequencies. Each of the plurality of operating frequencies may comprise a corresponding level of the calibration capabilities. In some aspects, the first set of one or more levels of the calibration capabilities may be associated with a plurality of temperature levels. Each of the plurality of temperature levels may comprise a corresponding level of the calibration capabilities. In some aspects, the first set of one or more levels of the calibration capabilities may be associated with a plurality of gain stage levels. Each of the plurality of gain stage levels may comprise a corresponding level of the calibration capabilities. In some aspects, the partial antenna calibration may be based on the amount of the antenna elements that are fully calibrated or not calibrated.

At 804, the first UE may perform an online calibration procedure with the second UE. For example, 804 may be performed by calibration component 198 of apparatus 1004. The first UE may perform the online calibration procedure with the second UE based at least on the first calibration capability message indicating the first set of one or more levels of the calibration capabilities, based on any of the aspects described in connection with FIG. 6.

Figure 9:
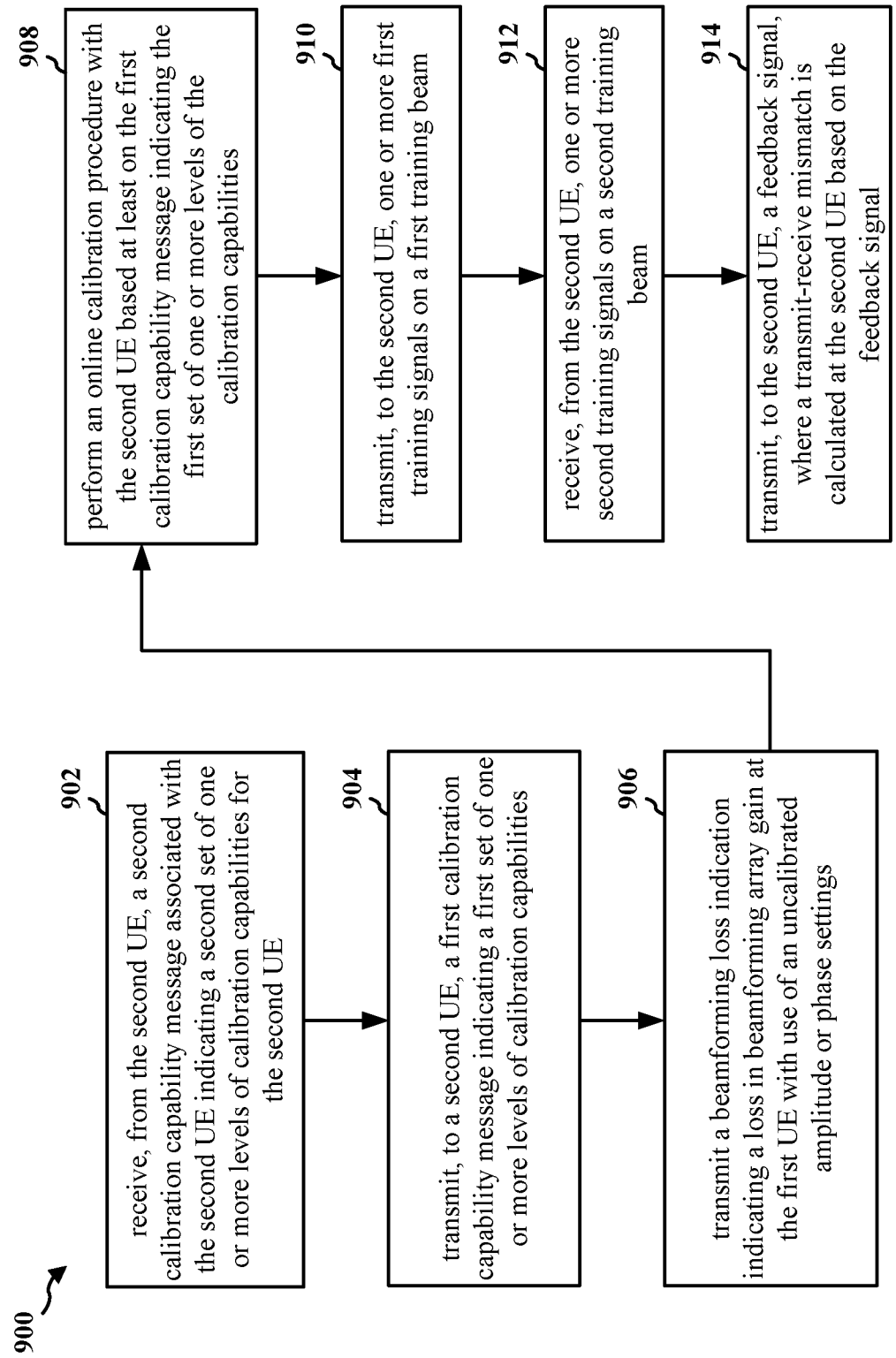
FIG. 9 is a flowchart of a method of wireless communication.

FIG. 9 is a flowchart 900 of a method of wireless communication. The method may be performed by a UE (e.g., the UE 104; the apparatus 1004). One or more of the illustrated operations may be omitted, transposed, or contemporaneous. The method may allow a first UE to perform an online calibration procedure with a second UE based on calibration capabilities shared between the first and second UEs.

At 902, the first UE may receive a second calibration capability message. For example, 902 may be performed by calibration component 198 of apparatus 1004. The first UE may receive the second calibration capability message from the second UE, based on any of the aspects described in connection with FIG. 6. The second calibration capability message may be associated with the second UE. The second calibration capability message may indicate a second set of one or more levels of the calibration capabilities for the second UE.

At 904, the first UE may transmit a first calibration capability message. For example, 904 may be performed by calibration component 198 of apparatus 1004. The first UE may transmit the first calibration capability message to a second UE, based on any of the aspects described in connection with FIG. 6. The first calibration capability message may indicate a first set of one or more levels of calibration capabilities. In some aspects, the first set of one or more levels of the calibration capabilities may comprise at least one of full antenna calibration, partial antenna calibration, or no antenna calibration. The first calibration capability message may also comprise an amount of antenna elements at the first UE. The first set of one or more levels of the calibration capabilities may be associated with at least one operating frequency, at least one temperature level, or at least one gain stage level. In some aspects, the first set of one or more levels of the calibration capabilities may be associated with a plurality of operating frequencies. Each of the plurality of operating frequencies may comprise a corresponding level of the calibration capabilities. In some aspects, the first set of one or more levels of the calibration capabilities may be associated with a plurality of temperature levels. Each of the plurality of temperature levels may comprise a corresponding level of the calibration capabilities. In some aspects, the first set of one or more levels of the calibration capabilities may be associated with a plurality of gain stage levels. Each of the plurality of gain stage levels may comprise a corresponding level of the calibration capabilities. In some aspects, the partial antenna calibration may be based on the amount of the antenna elements that are fully calibrated or not calibrated.

At 906, the first UE may transmit a beamforming loss indication. For example, 906 may be performed by calibration component 198 of apparatus 1004. The first UE may transmit the beamforming loss indication to the second UE, based on any of the aspects described in connection with FIG. 6. The beamforming loss indication may indicate a loss in beamforming array gain at the first UE with use of an uncalibrated amplitude or phase settings corresponding to at least one of an operating frequency, a temperature level, or a gain stage level. The beamforming loss indication may trigger the online calibration procedure with the second UE.

At 908, the first UE may perform an online calibration procedure with the second UE. For example, 908 may be performed by calibration component 198 of apparatus 1004. The first UE may perform the online calibration procedure with the second UE based at least on the first calibration capability message indicating the first set of one or more levels of the calibration capabilities, based on any of the aspects described in connection with FIG. 6. In some aspects, the performing the online calibration procedure may be based at least on the first calibration capability message associated with the first UE and the second calibration capability message associated with the second UE.

At 910, the first UE may transmit one or more first training signals. For example, 910 may be performed by calibration component 198 of apparatus 1004. The first UE may transmit the one or more first training signals to the second UE, based on any of the aspects described in connection with FIG. 6. The first UE may transmit the one or more first training signals on a first training beam.

At 912, the first UE may receive one or more training signals. For example, 912 may be performed by calibration component 198 of apparatus 1004. The first UE may receive the one or more training signals from the second UE, based on any of the aspects described in connection with FIG. 6. The first UE may receive the one or more training signals from the second UE on a second training beam.

At 914, the first UE may transmit a feedback signal. For example, 914 may be performed by calibration component 198 of apparatus 1004. The first UE may transmit the feedback signal to the second UE, based on any of the aspects described in connection with FIG. 6. In some aspects, a transmit-receive mismatch may be calculated at the second UE based on the feedback signal. In some aspects, the first UE may be fully calibrated and a number of measurements to fully calibrate the second UE may be based on an amount of antenna elements at the second UE. In some aspects, the first UE and the second UE may not be fully calibrated, wherein the online calibration procedure is repeated based on an amount of antenna elements at both the first UE and the second UE.

Figure 10:
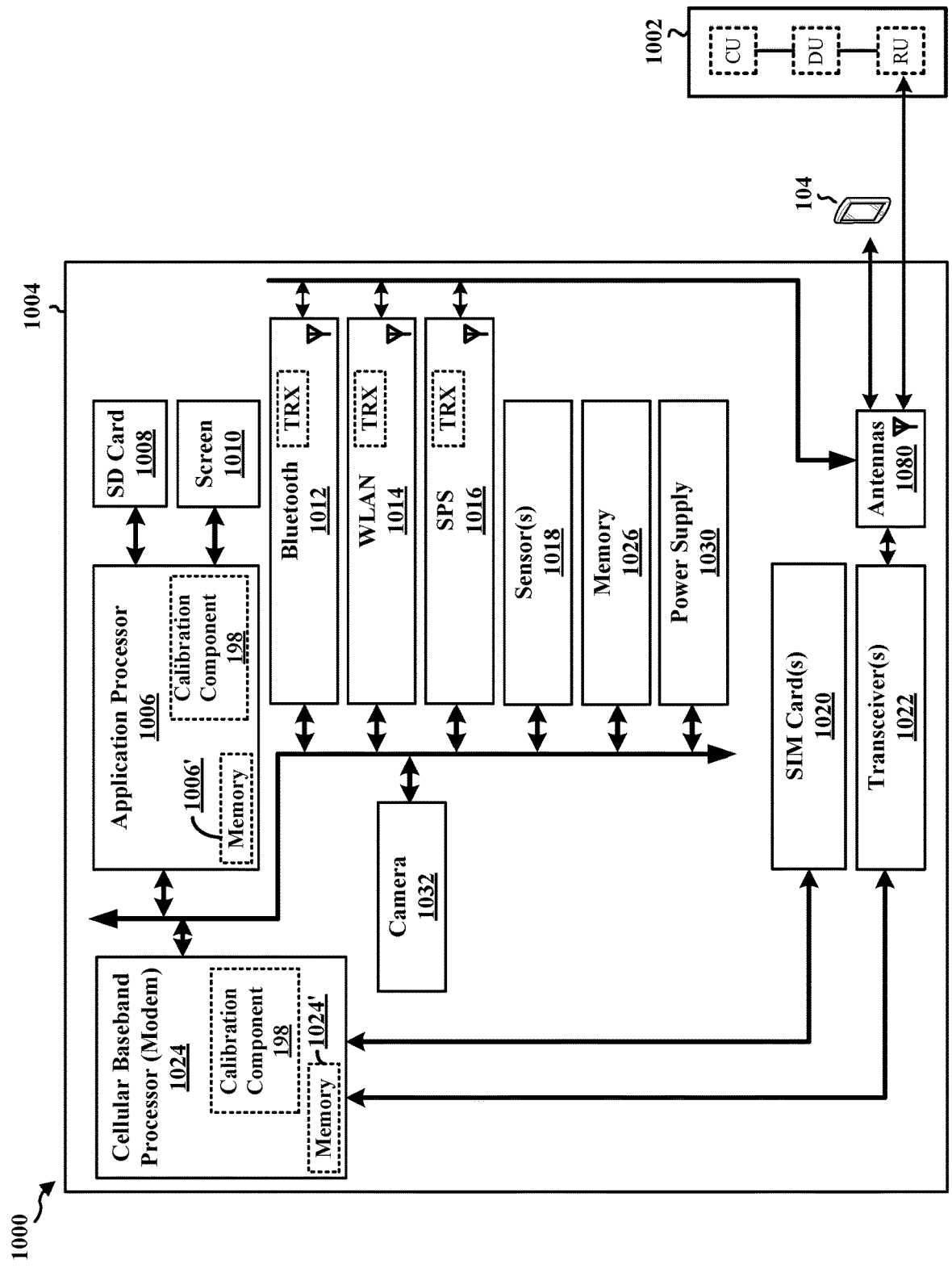
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the device 350 and may include the memory 360 and/or at least one of the TX processor 368, the RX processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., sec 350 of FIG. 3) and include the additional modules of the apparatus 1004.

As discussed supra, the component 198 is configured to transmit, to a second UE, a first calibration capability message indicating a first set of one or more levels of calibration capabilities; and perform an online calibration procedure with the second UE based at least on the first calibration capability message indicating the first set of one or more levels of the calibration capabilities. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for transmitting, to a second UE, a first calibration capability message indicating a first set of one or more levels of calibration capabilities. The apparatus includes means for performing an online calibration procedure with the second UE based at least on the first calibration capability message indicating the first set of one or more levels of the calibration capabilities. The apparatus further includes means for receiving, from the second UE, a second calibration capability message associated with the second UE indicating a second set of one or more levels of the calibration capabilities for the second UE. The apparatus further includes means for transmitting a beamforming loss indication indicating a loss in beamforming array gain at the first UE with use of an uncalibrated amplitude or phase settings corresponding to at least one of an operating frequency, a temperature level, or a gain stage level. The beamforming loss indication triggers the online calibration procedure with the second UE. The apparatus further includes means for transmitting, to the second UE, one or more first training signals on a first training beam. The apparatus further includes means for receiving, from the second UE, one or more second training signals on a second training beam. The apparatus further includes means for transmitting, to the second UE, a feedback signal, wherein a transmit-receive mismatch is calculated at the second UE based on the feedback signal. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
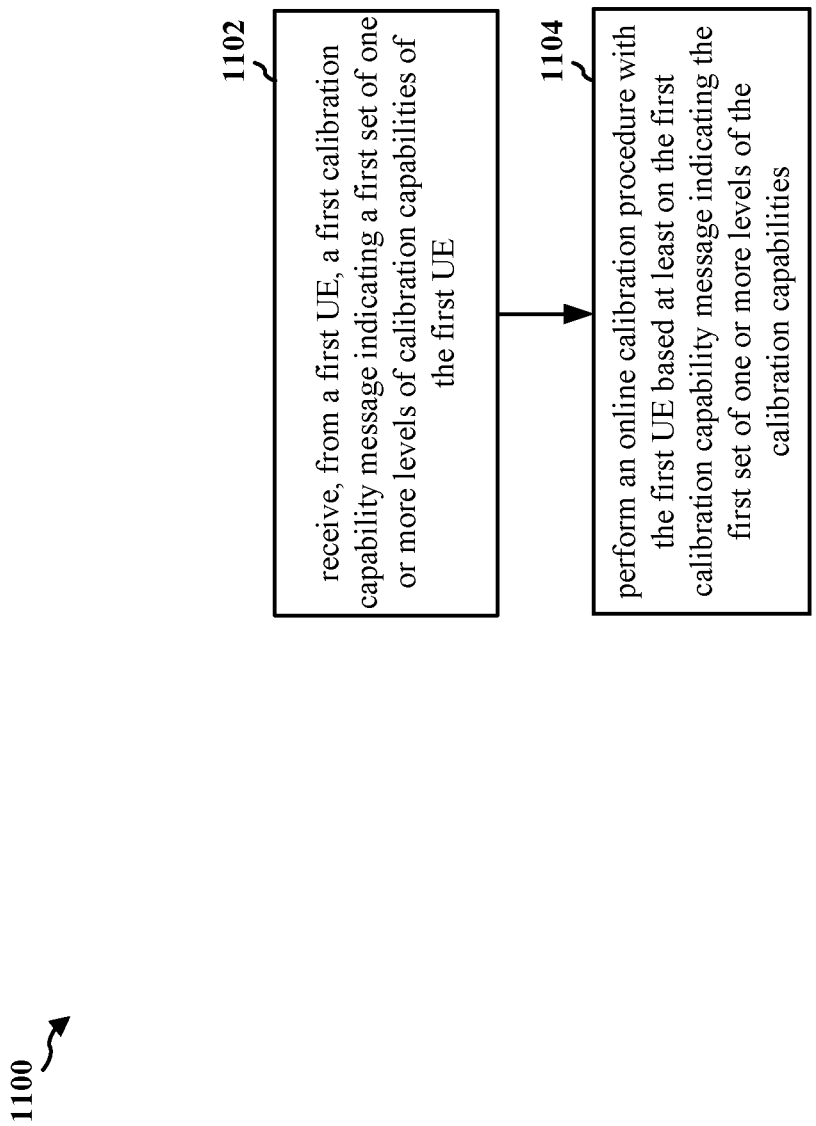
FIG. 11 is a flowchart of a method of wireless communication.

FIG. 11 is a flowchart 1100 of a method of wireless communication. The method may be performed by a UE (e.g., the UE 104; the apparatus 1304). One or more of the illustrated operations may be omitted, transposed, or contemporaneous. The method may allow a first UE to perform an online calibration procedure with a second UE based on calibration capabilities shared between the first and second UEs.

At 1102, the second UE may receive a first calibration capability message. For example, 1102 may be performed by calibration component 199 of apparatus 1304. The second UE may receive the first calibration capability message from the first UE, based on any of the aspects described in connection with FIG. 6. The first calibration capability message may indicate a first set of one or more levels of calibration capabilities of the first UE. In some aspects, the first set of one or more levels of the calibration capabilities comprise at least one of full antenna calibration, partial antenna calibration, or no antenna calibration. The second calibration capability message may also comprise an amount of antenna elements at the second UE. In some aspects, the first set of one or more levels of the calibration capabilities may be associated with at least one operating frequency, at least one temperature level, or at least one gain stage level. In some aspects, the first set of one or more levels of the calibration capabilities may be associated with a plurality of operating frequencies. The plurality of operating frequencies may comprise a corresponding level of the calibration capabilities. In some aspects, the first set of one or more levels of the calibration capabilities may be associated with a plurality of temperature levels. Each of the plurality of temperature levels may comprise a corresponding level of the calibration capabilities. In some aspects, the first set of one or more levels of the calibration capabilities are associated with a plurality of gain stage levels. Each of the plurality of gain stage levels may comprise a corresponding level of the calibration capabilities. In some aspects, the partial antenna calibration may be based on the amount of the antenna elements that are fully calibrated or not calibrated.

At 1104, the second UE may perform an online calibration procedure with the first UE. For example, 1104 may be performed by calibration component 199 of apparatus 1304. The second UE may perform the online calibration procedure with the first UE based at least on the first calibration capability message indicating the first set of one or more levels of the calibration capabilities, based on any of the aspects described in connection with FIG. 6.

Figure 12:
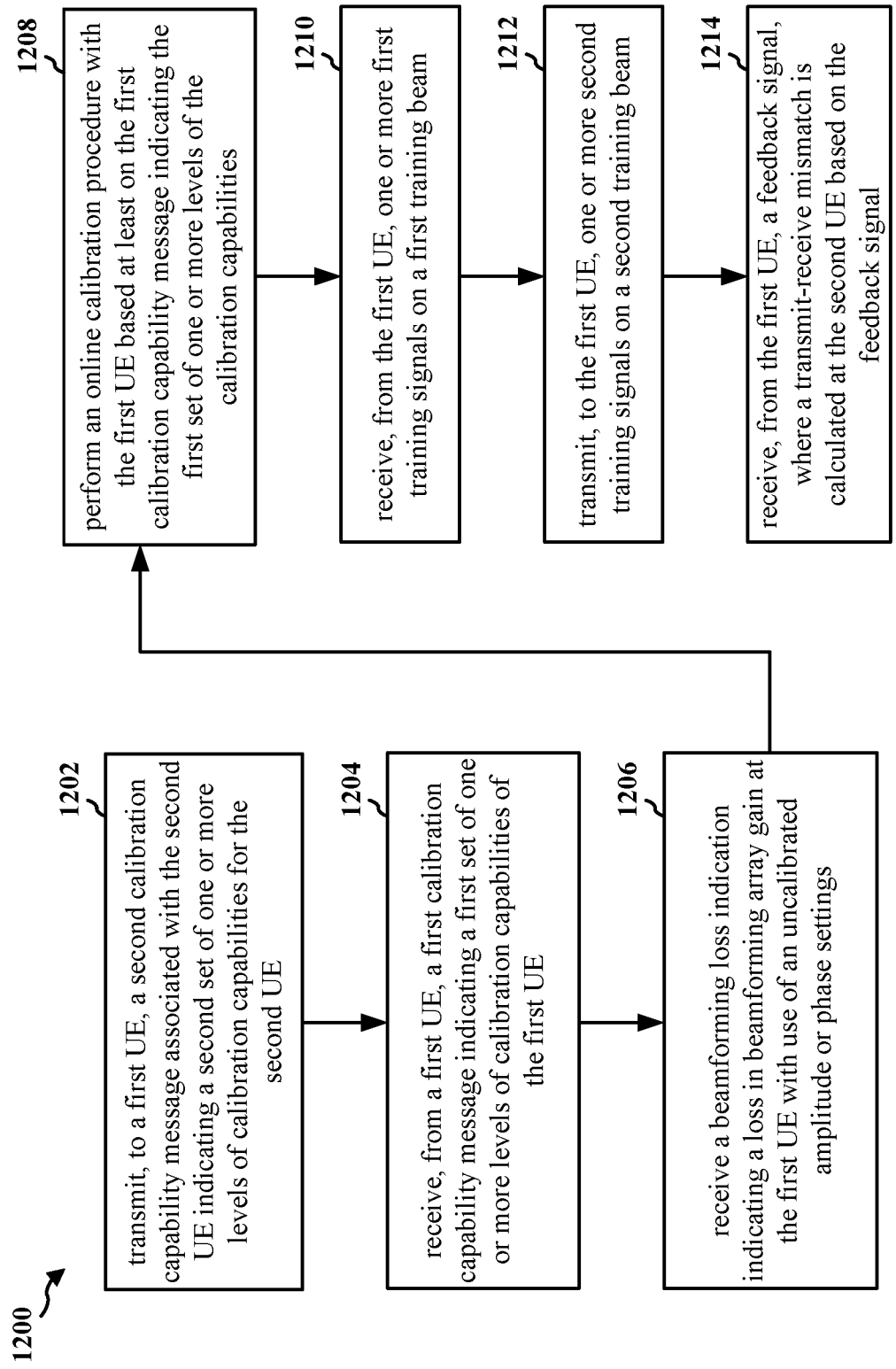
FIG. 12 is a flowchart of a method of wireless communication.

FIG. 12 is a flowchart 1200 of a method of wireless communication. The method may be performed by a UE (e.g., the UE 104; the apparatus 1304). One or more of the illustrated operations may be omitted, transposed, or contemporaneous. The method may allow a first UE to perform an online calibration procedure with a second UE based on calibration capabilities shared between the first and second UEs.

At 1202, the second UE may transmit a second calibration capability message. For example, 1202 may be performed by calibration component 199 of apparatus 1304. The second UE may transmit the second calibration capability message to the first UE, based on any of the aspects described in connection with FIG. 6. The second calibration capability message may be associated with the second UE. The second calibration capability message may indicate a second set of one or more levels of the calibration capabilities for the second UE. The second calibration capability message may also comprise an amount of antenna elements at the second UE.

At 1204, the second UE may receive a first calibration capability message. For example, 1204 may be performed by calibration component 199 of apparatus 1304. The second UE may receive the first calibration capability message from the first UE, based on any of the aspects described in connection with FIG. 6. The first calibration capability message may indicate a first set of one or more levels of calibration capabilities of the first UE. In some aspects, the first set of one or more levels of the calibration capabilities comprise at least one of full antenna calibration, partial antenna calibration, or no antenna calibration. In some aspects, the first set of one or more levels of the calibration capabilities may be associated with at least one operating frequency, at least one temperature level, or at least one gain stage level. In some aspects, the first set of one or more levels of the calibration capabilities may be associated with a plurality of operating frequencies. The plurality of operating frequencies may comprise a corresponding level of the calibration capabilities. In some aspects, the first set of one or more levels of the calibration capabilities may be associated with a plurality of temperature levels. Each of the plurality of temperature levels may comprise a corresponding level of the calibration capabilities. In some aspects, the first set of one or more levels of the calibration capabilities are associated with a plurality of gain stage levels. Each of the plurality of gain stage levels may comprise a corresponding level of the calibration capabilities. In some aspects, the partial antenna calibration may be based on the amount of the antenna elements that are fully calibrated or not calibrated.

At 1206, the second UE may receive a beamforming loss indication. For example, 1206 may be performed by calibration component 199 of apparatus 1304. The second UE may receive the beamforming loss indication from the first UE, based on any of the aspects described in connection with FIG. 6. The beamforming loss indication may indicate a loss in beamforming array gain at the first UE with use of an uncalibrated amplitude or phase settings corresponding to at least one of an operating frequency, a temperature level, or a gain stage level. The beamforming loss indication may trigger the online calibration procedure with the first UE.

At 1208, the second UE may perform an online calibration procedure with the first UE. For example, 1104 may be performed by calibration component 199 of apparatus 1304. The second UE may perform the online calibration procedure with the first UE based at least on the first calibration capability message indicating the first set of one or more levels of the calibration capabilities, based on any of the aspects described in connection with FIG. 6. In some aspects, the performing the online calibration procedure may be based at least on the first calibration capability message associated with the first UE and the second calibration capability message associated with the second UE.

At 1210, the second UE may receive one or more training signals. For example, 1210 may be performed by calibration component 199 of apparatus 1304. The second UE may receive the one or more training signals from the first UE, based on any of the aspects described in connection with FIG. 6. The second UE may receive the one or more first training signals on a first training beam.

At 1212, the second UE may transmit one or more training signals. For example, 1212 may be performed by calibration component 199 of apparatus 1304. The second UE may transmit the one or more second training signals to the first UE, based on any of the aspects described in connection with FIG. 6. The second UE may transmit the one or more second training signals on a second training beam.

At 1214, the second UE may receive a feedback signal. For example, 1214 may be performed by calibration component 199 of apparatus 1304. The second UE may receive the feedback signal from the first UE, based on any of the aspects described in connection with FIG. 6. A transmit-receive mismatch may be calculated at the second UE based on the feedback signal. In some aspects, the first UE may be fully calibrated and a number of measurements to fully calibrate the second UE may be based on an amount of antenna elements at the second UE. In some aspects, the first UE and the second UE may not be fully calibrated, wherein the online calibration procedure is repeated based on an amount of antenna elements at both the first UE and the second UE.

Figure 13:
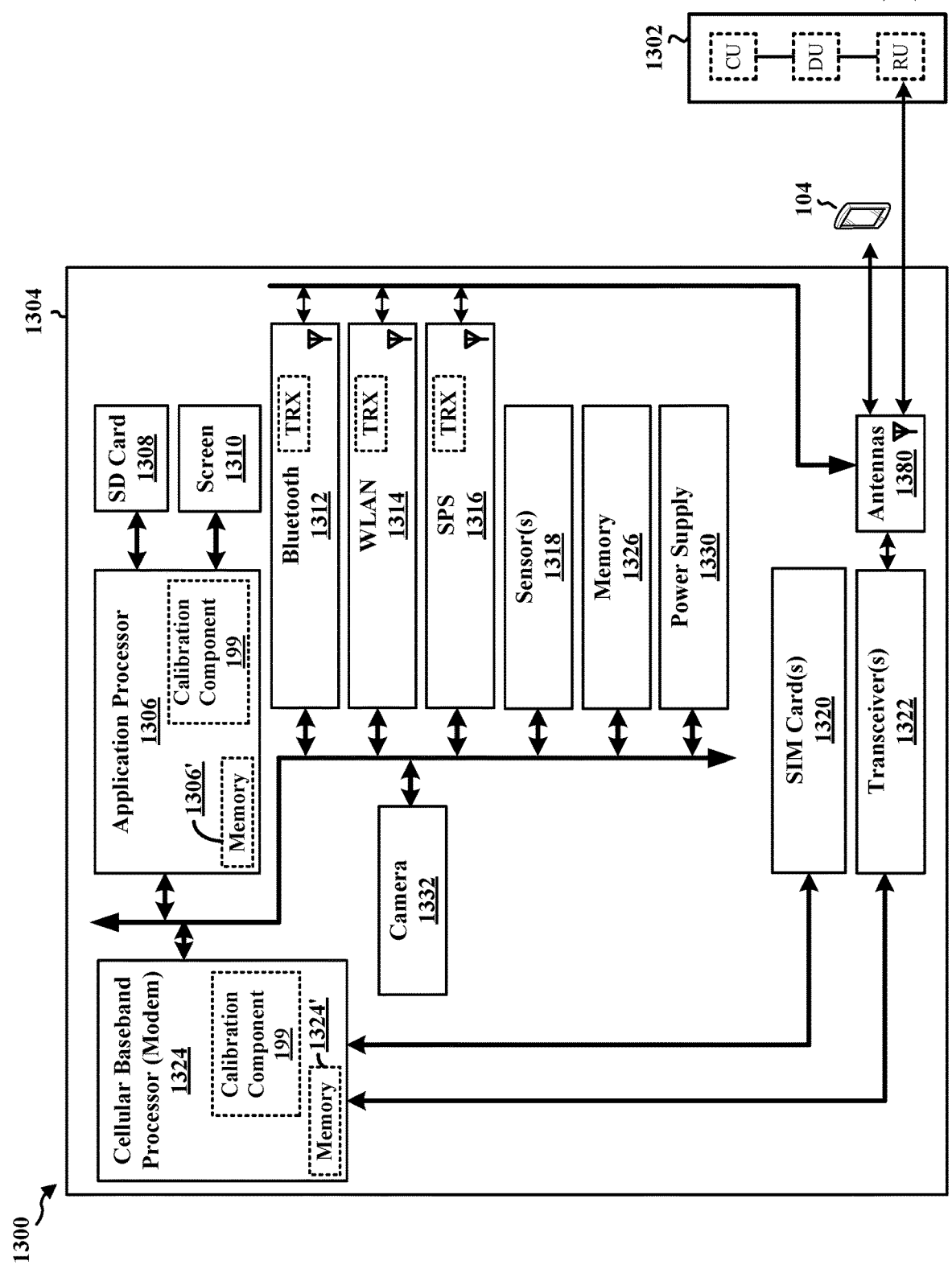
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the device 310 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., sec 310 of FIG. 3) and include the additional modules of the apparatus 1304.

As discussed supra, the component 199 is configured to receive, from a first UE, a first calibration capability message indicating a first set of one or more levels of calibration capabilities of the first UE; and perform an online calibration procedure with the first UE based at least on the first calibration capability message indicating the first set of one or more levels of the calibration capabilities. The component 199 may be within the cellular baseband processor 1324, the application processor 1306, or both the cellular baseband processor 1324 and the application processor 1306. The component 198 may be one or more hardware components specifically configured to carry out the stated processes/ algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving, from a first UE, a first calibration capability message indicating a first set of one or more levels of calibration capabilities of the first UE. The apparatus includes means for performing an online calibration procedure with the first UE based at least on the first calibration capability message indicating the first set of one or more levels of the calibration capabilities. The apparatus further includes means for transmitting, to the first UE, a second calibration capability message associated with the second UE indicating a second set of one or more levels of the calibration capabilities for the second UE. The apparatus further includes means for receiving a beamforming loss indication indicating a loss in beamforming array gain at the first UE with use of an uncalibrated amplitude or phase settings corresponding to at least one of an operating frequency, a temperature level, or a gain stage level. The beamforming loss indication triggers the online calibration procedure with the first UE. The apparatus further includes means for receiving, from the first UE, one or more first training signals on a first training beam. The apparatus further includes means for transmitting, to the first UE, one or more second training signals on a second training beam. The apparatus further includes means for receiving, from the first UE, a feedback signal, wherein a transmit-receive mismatch is calculated at the second UE based on the feedback signal. The means may be the component 199 of the apparatus 1304 configured to perform the functions recited by the means. As described supra, the apparatus 1304 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE comprising transmitting, to a second UE, a first calibration capability message indicating a first set of one or more levels of calibration capabilities; and performing an online calibration procedure with the second UE based at least on the first calibration capability message indicating the first set of one or more levels of the calibration capabilities.

Aspect 2 is the method of aspect 1, further including receiving, from the second UE, a second calibration capability message associated with the second UE indicating a second set of one or more levels of the calibration capabilities for the second UE.

Aspect 3 is the method of any of aspects 1 and 2, further includes that performing the online calibration procedure is based at least on the first calibration capability message associated with the first UE and the second calibration capability message associated with the second UE.

Aspect 4 is the method of any of aspects 1-3, further includes that the first set of one or more levels of the calibration capabilities comprise at least one of full antenna calibration, partial antenna calibration, or no antenna calibration, wherein the first calibration capability message also comprises an amount of antenna elements at the first UE.

Aspect 5 is the method of any of aspects 1-4, further includes that the first set of one or more levels of the calibration capabilities are associated with at least one operating frequency, at least one temperature level, or at least one gain stage level.

Aspect 6 is the method of any of aspects 1-5, further includes that the first set of one or more levels of the calibration capabilities are associated with a plurality of operating frequencies, wherein each of the plurality of operating frequencies comprise a corresponding level of the calibration capabilities.

Aspect 7 is the method of any of aspects 1-6, further includes that the first set of one or more levels of the calibration capabilities are associated with a plurality of temperature levels, wherein each of the plurality of temperature levels comprise a corresponding level of the calibration capabilities.

Aspect 8 is the method of any of aspects 1-7, further includes that the first set of one or more levels of the calibration capabilities are associated with a plurality of gain stage levels, wherein each of the plurality of gain stage levels comprise a corresponding level of the calibration capabilities.

Aspect 9 is the method of any of aspects 1-8, further includes that the partial antenna calibration is based on the amount of the antenna elements that are fully calibrated or not calibrated.

Aspect 10 is the method of any of aspects 1-9, further including transmitting a beamforming loss indication indicating a loss in beamforming array gain at the first UE with use of an uncalibrated amplitude or phase settings corresponding to at least one of an operating frequency, a temperature level, or a gain stage level, wherein the beamforming loss indication triggers the online calibration procedure with the second UE.

Aspect 11 is the method of any of aspects 1-10, further including transmitting, to the second UE, one or more first training signals on a first training beam; receiving, from the second UE, one or more second training signals on a second training beam; and transmitting, to the second UE, a feedback signal, wherein a transmit-receive mismatch is calculated at the second UE based on the feedback signal.

Aspect 12 is the method of any of aspects 1-11, further includes that the first UE is fully calibrated and a number of measurements to fully calibrate the second UE is based on an amount of antenna elements at the second UE.

Aspect 13 is the method of any of aspects 1-12, further includes that the first UE and the second UE are not fully calibrated, wherein the online calibration procedure is repeated based on an amount of antenna elements at both the first UE and the second UE.

Aspect 14 is an apparatus for wireless communication at a first UE including at least one processor coupled to a memory and at least one transceiver, the at least one processor configured to implement any of Aspects 1-13.

Aspect 15 is an apparatus for wireless communication at a first UE including means for implementing any of Aspects 1-13.

Aspect 16 is a computer-readable medium storing computer executable code, where the code when executed by a processor causes the processor to implement any of Aspects 1-13.

Aspect 17 is a method of wireless communication at a second UE comprising receiving, from a first UE, a first calibration capability message indicating a first set of one or more levels of calibration capabilities of the first UE; and performing an online calibration procedure with the first UE based at least on the first calibration capability message indicating the first set of one or more levels of the calibration capabilities.

Aspect 18 is the method of aspect 17, further including transmitting, to the first UE, a second calibration capability message associated with the second UE indicating a second set of one or more levels of the calibration capabilities for the second UE.

Aspect 19 is the method of any of aspects 17 and 18, further includes that performing the online calibration procedure is based at least on the first calibration capability message associated with the first UE and the second calibration capability message associated with the second UE.

Aspect 20 is the method of any of aspects 17-19, further includes that the first set of one or more levels of the calibration capabilities comprise at least one of full antenna calibration, partial antenna calibration, or no antenna calibration, wherein the second calibration capability message also comprises an amount of antenna elements at the second UE.

Aspect 21 is the method of any of aspects 17-20, further includes that the first set of one or more levels of the calibration capabilities are associated with at least one operating frequency, at least one temperature level, or at least one gain stage level.

Aspect 22 is the method of any of aspects 17-21, further includes that the first set of one or more levels of the calibration capabilities are associated with a plurality of operating frequencies, wherein each of the plurality of operating frequencies comprise a corresponding level of the calibration capabilities.

Aspect 23 is the method of any of aspects 17-22, further includes that the first set of one or more levels of the calibration capabilities are associated with a plurality of temperature levels, wherein each of the plurality of temperature levels comprise a corresponding level of the calibration capabilities.

Aspect 24 is the method of any of aspects 17-23, further includes that the first set of one or more levels of the calibration capabilities are associated with a plurality of gain stage levels, wherein each of the plurality of gain stage levels comprise a corresponding level of the calibration capabilities.

Aspect 25 is the method of any of aspects 17-24, further includes that the partial antenna calibration is based on the amount of the antenna elements that are fully calibrated or not calibrated.

Aspect 26 is the method of any of aspects 17-25, further including receiving a beamforming loss indication indicating a loss in beamforming array gain at the first UE with use of an uncalibrated amplitude or phase settings corresponding to at least one of an operating frequency, a temperature level, or a gain stage level, wherein the beamforming loss indication triggers the online calibration procedure with the first UE.

Aspect 27 is the method of any of aspects 17-26, further including receiving, from the first UE, one or more first training signals on a first training beam; transmitting, to the first UE, one or more second training signals on a second training beam; and receiving, from the first UE, a feedback signal, wherein a transmit-receive mismatch is calculated at the second UE based on the feedback signal.

Aspect 28 is the method of any of aspects 17-27, further includes that the first UE is fully calibrated and a number of measurements to fully calibrate the second UE is based on an amount of antenna elements at the second UE.

Aspect 29 is the method of any of aspects 17-28, further includes that the first UE and the second UE are not fully calibrated, wherein the online calibration procedure is repeated based on an amount of antenna elements at both the first UE and the second UE.

Aspect 30 is an apparatus for wireless communication at a second UE including at least one processor coupled to a memory and at least one transceiver, the at least one processor configured to implement any of Aspects 17-29.

Aspect 31 is an apparatus for wireless communication at a second UE including means for implementing any of Aspects 17-29.

Aspect 32 is a computer-readable medium storing computer executable code, where the code when executed by a processor causes the processor to implement any of Aspects 17-29.

What is claimed is:

1. An apparatus for wireless communication at a first user equipment (UE), comprising:
   a memory; and
   at least one processor coupled to the memory and, based at least in part on information stored in the memory, the at least one processor is configured to:
   transmit, to a second UE, a first calibration capability message indicating a first set of one or more levels of calibration capabilities; and
   perform an online calibration procedure with the second UE based at least on the first calibration capability message indicating the first set of one or more levels of the calibration capabilities.

2. The apparatus of claim 1, further comprising a transceiver coupled to the at least one processor.

3. The apparatus of claim 1, wherein the at least one processor is configured to:
   receive, from the second UE, a second calibration capability message associated with the second UE indicating a second set of one or more levels of the calibration capabilities for the second UE.

4. The apparatus of claim 3, wherein performing the online calibration procedure is based at least on the first calibration capability message associated with the first UE and the second calibration capability message associated with the second UE.

5. The apparatus of claim 1, wherein the first set of one or more levels of the calibration capabilities comprise at least one of full antenna calibration, partial antenna calibration, or no antenna calibration, wherein the first calibration capability message also comprises an amount of antenna elements at the first UE.

6. The apparatus of claim 5, wherein the first set of one or more levels of the calibration capabilities are associated with at least one operating frequency, at least one temperature level, or at least one gain stage level.

7. The apparatus of claim 6, wherein the first set of one or more levels of the calibration capabilities are associated with a plurality of operating frequencies, wherein each of the plurality of operating frequencies comprise a corresponding level of the calibration capabilities.

8. The apparatus of claim 6, wherein the first set of one or more levels of the calibration capabilities are associated with a plurality of temperature levels, wherein each of the plurality of temperature levels comprise a corresponding level of the calibration capabilities.

9. The apparatus of claim 6, wherein the first set of one or more levels of the calibration capabilities are associated with a plurality of gain stage levels, wherein each of the plurality of gain stage levels comprise a corresponding level of the calibration capabilities.

10. The apparatus of claim 5, wherein the partial antenna calibration is based on the amount of the antenna elements that are fully calibrated or not calibrated.

11. The apparatus of claim 1, wherein the at least one processor is configured to:
transmit a beamforming loss indication indicating a loss in beamforming array gain at the first UE with use of an uncalibrated amplitude or phase settings corresponding to at least one of an operating frequency, a temperature level, or a gain stage level, wherein the beamforming loss indication triggers the online calibration procedure with the second UE.

12. The apparatus of claim 1, wherein to perform the online calibration procedure, the at least one processor is configured to:
transmit, to the second UE, one or more first training signals on a first training beam;
receive, from the second UE, one or more second training signals on a second training beam; and
transmit, to the second UE, a feedback signal, wherein a transmit-receive mismatch is calculated at the second UE based on the feedback signal.

13. The apparatus of claim 12, wherein the first UE is fully calibrated and a number of measurements to fully calibrate the second UE is based on an amount of antenna elements at the second UE.

14. The apparatus of claim 12, wherein the first UE and the second UE are not fully calibrated, wherein the online calibration procedure is repeated based on an amount of antenna elements at both the first UE and the second UE.

15. A method of wireless communication at a first user equipment (UE), comprising:
transmitting, to a second UE, a first calibration capability message indicating a first set of one or more levels of calibration capabilities; and
performing an online calibration procedure with the second UE based at least on the first calibration capability message indicating the first set of one or more levels of the calibration capabilities.

16. An apparatus for wireless communication at a second user equipment (UE), comprising:
a memory; and
at least one processor coupled to the memory and, based at least in part on information stored in the memory, the at least one processor is configured to:
receive, from a first UE, a first calibration capability message indicating a first set of one or more levels of calibration capabilities of the first UE; and
perform an online calibration procedure with the first UE based at least on the first calibration capability message indicating the first set of one or more levels of the calibration capabilities.

17. The apparatus of claim 16, further comprising a transceiver coupled to the at least one processor.

18. The apparatus of claim 16, wherein the at least one processor is configured to:
transmit, to the first UE, a second calibration capability message associated with the second UE indicating a second set of one or more levels of the calibration capabilities for the second UE.

19. The apparatus of claim 18, wherein performing the online calibration procedure is based at least on the first calibration capability message associated with the first UE and the second calibration capability message associated with the second UE.

20. The apparatus of claim 18, wherein the first set of one or more levels of the calibration capabilities comprise at least one of full antenna calibration, partial antenna calibration, or no antenna calibration, wherein the second calibration capability message also comprises an amount of antenna elements at the second UE.

21. The apparatus of claim 20, wherein the first set of one or more levels of the calibration capabilities are associated with at least one operating frequency, at least one temperature level, or at least one gain stage level.

22. The apparatus of claim 21, wherein the first set of one or more levels of the calibration capabilities are associated with a plurality of operating frequencies, wherein each of the plurality of operating frequencies comprise a corresponding level of the calibration capabilities.

23. The apparatus of claim 21, wherein the first set of one or more levels of the calibration capabilities are associated with a plurality of temperature levels, wherein each of the plurality of temperature levels comprise a corresponding level of the calibration capabilities.

24. The apparatus of claim 21, wherein the first set of one or more levels of the calibration capabilities are associated with a plurality of gain stage levels, wherein each of the plurality of gain stage levels comprise a corresponding level of the calibration capabilities.

25. The apparatus of claim 20, wherein the partial antenna calibration is based on the amount of the antenna elements that are fully calibrated or not calibrated.

26. The apparatus of claim 16, wherein the at least one processor is configured to:
receive a beamforming loss indication indicating a loss in beamforming array gain at the first UE with use of an uncalibrated amplitude or phase settings corresponding to at least one of an operating frequency, a temperature level, or a gain stage level, wherein the beamforming loss indication triggers the online calibration procedure with the first UE.

27. The apparatus of claim 16, wherein to perform the online calibration procedure, the at least one processor is configured to:
- receive, from the first UE, one or more first training signals on a first training beam;
- transmit, to the first UE, one or more second training signals on a second training beam; and
- receive, from the first UE, a feedback signal, wherein a transmit-receive mismatch is calculated at the second UE based on the feedback signal.

28. The apparatus of claim 27, wherein the first UE is fully calibrated and a number of measurements to fully calibrate the second UE is based on an amount of antenna elements at the second UE.

29. The apparatus of claim 27, wherein the first UE and the second UE are not fully calibrated, wherein the online calibration procedure is repeated based on an amount of antenna elements at both the first UE and the second UE.

30. A method of wireless communication at a second user equipment (UE), comprising:
- receiving, from a first UE, a first calibration capability message indicating one or more levels of calibration capabilities of the first UE; and
- performing an online calibration procedure with the first UE based at least on the first calibration capability message indicating the one or more levels of the calibration capabilities.

* * * * *